(12) United States Patent
Sasaoka

(10) Patent No.: US 6,651,752 B2
(45) Date of Patent: Nov. 25, 2003

(54) SUPPORT BRACKET FOR USE WITH TILLER

(75) Inventor: Masayuki Sasaoka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 09/966,717

(22) Filed: Sep. 27, 2001

(65) Prior Publication Data

US 2002/0046846 A1 Apr. 25, 2002

(30) Foreign Application Priority Data

Oct. 24, 2000 (JP) .................................. 2000-324473

(51) Int. Cl.$^7$ .............................................. A01B 33/00
(52) U.S. Cl. ........................................ 172/42; 24/535
(58) Field of Search ............................. 172/42, 41, 14, 172/17; 24/535

(56) References Cited

U.S. PATENT DOCUMENTS

| | | | | |
|---|---|---|---|---|
| 795,782 A | * | 7/1905 | Porter | 248/229.21 |
| 1,903,863 A | * | 4/1933 | Hayden | 403/79 |
| 2,042,007 A | | 5/1936 | Kennedy | 46/29 |
| 2,650,404 A | | 9/1953 | Dalpiaz | 24/243 |
| 3,906,592 A | * | 9/1975 | Sakasegawa et al. | 248/68.1 |
| 4,224,784 A | * | 9/1980 | Hansen et al. | 56/16.9 |
| 4,354,564 A | * | 10/1982 | Watanabe et al. | 180/19.1 |
| 4,526,756 A | * | 7/1985 | Wong | 422/104 |
| 4,640,366 A | * | 2/1987 | Saito | 172/42 |
| 5,255,546 A | * | 10/1993 | Saunders et al. | 70/233 |
| 5,317,807 A | * | 6/1994 | Pulley | 30/296.1 |
| 6,488,101 B1 | * | 12/2002 | Miyahara et al. | 172/46 |

FOREIGN PATENT DOCUMENTS

JP 58041103 3/1983

* cited by examiner

*Primary Examiner*—Thomas B. Will
*Assistant Examiner*—Alicia Torres
(74) *Attorney, Agent, or Firm*—Adams & Wilks (57) ABSTRACT

A support bracket includes a cylindrical portion sized to have a skid inserted therethrough, and a receiving portion sized to receive a handlebar. The cylindrical portion and the receiving portion are formed by bending a single plate in two. The plate includes a groove portion formed centrally thereof, right and left flat plate portions positioned rightwardly and leftwardly of said groove portion, right and left curved portions protruding outwardly from the right and left flat plate portions, respectively, and right and left connection portions protruding outwardly from the right and left curved portions, respectively. The right and left flat plate portions include right and left projecting portions, respectively. The right and left flat plate portions are reinforced by the right and left projecting portions. When the plate is bent in two, the flat plate portions are joined together to form the groove portion into the cylindrical portion. At the same time, the curved portions are opposed to each other to provide the receiving portions. Further, the connection portions are opposed to each other in such a manner as to be connected to a casing of a tiller.

4 Claims, 9 Drawing Sheets

SUPPORT BRACKET FOR USE WITH TILLER

BACKGROUND OF THE INVENTION

1. Field of the Invention

The present invention relates generally to a tiller, and in particular to a support bracket for use in mounting a handlebar and a skid to the tiller.

2. Description of the Related Art

There have been proposed brackets for use in attaching handlebars and skids to agricultural machines. One example of such brackets is known from Japanese Utility Model Laid-Open Publication No. SHO 58-41103 entitled "HAND-PUSHED AGRICULTURAL MACHINE".

Figure 10:
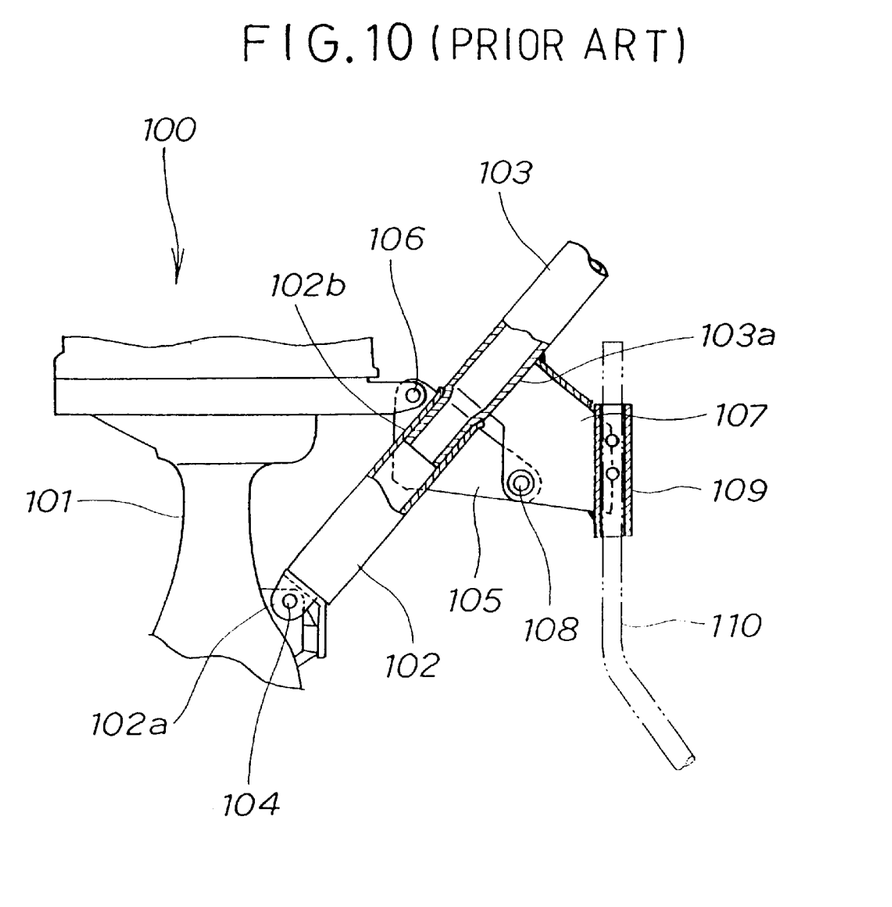
FIG. 10 shows a conventional bracket for use with a tiller.

FIG. 10 hereof shows a bracket of a machine 100 as disclosed in the publication. The machine 100 includes a handlebar 102 extending backwardly and upwardly from a body 101 thereof. The handlebar 102 has an operational handle 103 attached thereto.

The handlebar 102 has a lower mounting member 102a positioned at a lower end thereof. The member 102a is attached via a bolt 104 to the body 101. The handlebar 102 has a lower bracket 105 attached to an upper end 102b thereof. The lower bracket 105 is mounted to the body 101 by means of a bolt 106. The handlebar 102 thus arranged extends backwardly from the body 101 of the machine 100.

The handle 103 has an upper bracket 107 mounted to a lower end 103a thereof. The bracket 107 is attached through a bolt 108 to the bracket 105. This arrangement allows the attachment of the handle 103 to the handlebar 102.

The bracket 107 has a cylindrical member 109 provided at a rear end thereof. A skid 110 is inserted through the member 109. The skid 110 is to pierce soil to a selected depth at which tillage tines of the machine 100 are operated.

Mounting the handlebar 102 and the skid 110 to the body 101 of the machine 100 requires the three parts, that is, the lower bracket 105, the upper bracket 107, and the cylindrical member 109.

The machine 100 having as many as three parts is costly to manufacture. The machine 100 thus arranged is complicated in construction.

SUMMARY OF THE INVENTION

An object of the present invention is to provide a support bracket, which can be made using a minimum number of parts, for use with a tiller.

According to an aspect of the present invention, there is provided a support bracket for use in attaching a handlebar and a skid to a body of a tiller, the support bracket comprising: a cylindrical portion sized such that the skid is inserted therethrough; and a receiving portion sized to receive the handlebar; the cylindrical portion and the receiving portion being formed by bending a substantially rectangular single plate in two.

In a preferred form of the present invention, the plate includes: a groove portion formed centrally of the plate, the groove portion extending in a direction substantially perpendicular to a longitudinal direction of the plate; right and left flat plate portions positioned rightwardly and leftwardly of the groove portion, respectively; right and left curved portions extending in substantially parallel to the groove portion, the right curved portion extending outwardly from a right edge of the right flat plate portion, the left curved portion extending outwardly from a left edge of the left flat plate portion; and right and left connection portions extending in substantially parallel to the groove portion, the right connection portion extending outwardly from a right edge of the right curved portion, the left connection portion extending outwardly from a left edge of the left curved portion, when the plate is bent in two, the groove portion being formed into the cylindrical portion, the right and left curved portions being opposed to each other to provide the receiving portion, and the right and left connection portions being opposed to each other in such a manner as to be connected to the body of the tiller.

In a further preferred form of the present invention, the right and left flat plate portions include right and left projecting portions, respectively, extending longitudinally of the plate, the right projecting portion being positioned between the groove portion and the right curved portion, the left projecting portion being positioned between the groove portion and the left curved portion, the right and left projecting portion projecting in a direction in which the groove portion is concaved, the right and left projecting portions reinforcing the right and left flat plate portions, respectively.

The support bracket is a single plate bent in two. The plate includes the cylindrical portion sized such that the skid is inserted therethrough, the receiving portion sized to receive the handlebar, and the flat plate portions each extending between the cylindrical portion and the receiving portion.

Accordingly, it becomes possible to provide the bracket without requiring additional parts. The thus arranged bracket is simple in construction.

Each of the flat plate portions includes the projecting portion. By thus providing the projecting portions, the flat plate portions are reinforced to thereby increase in strength.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
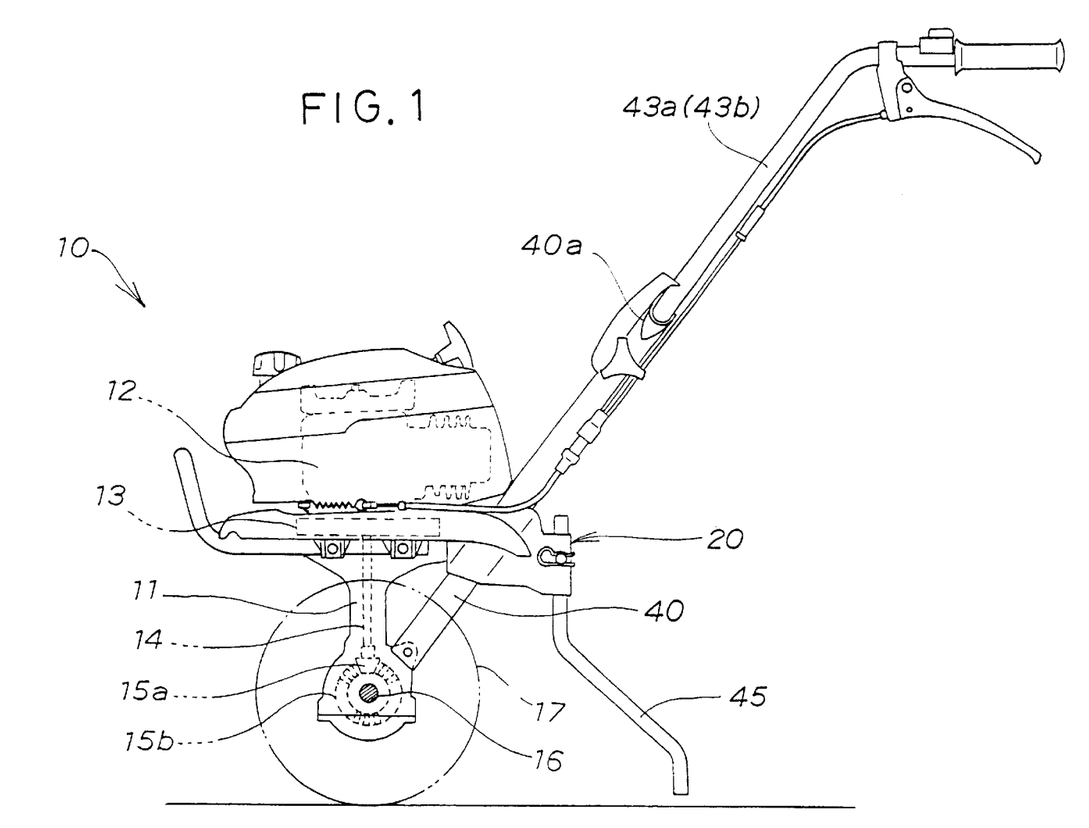
FIG. 1 is a side elevation view of a tiller employing a support bracket according to the present invention.

Referring to FIG. 1, a tiller or a soil management machine is shown generally designated by reference numeral 10. The tiller 10 includes a body (casing) 11 having a source 12 of motive power (engine) mounted on an upper end thereof. The engine 12 operates to rotate a drive shaft 14 through a clutch mechanism 13. Rotation of the drive shaft 14a uses a gear (pinion) is a to rotate a gear (bevel gear) 15b. As the gear 15b rotates, right and left tillage shafts 16, 16 (only left one shown) are rotated to thereby rotate tillage tines 17 (as shown by a phantom line) mounted to the shafts 16, 16. The tines 17 rotate to till soil.

The tiller 10 includes a support bracket 20 mounted to the casing 11. The bracket 20 includes a backwardly extending handlebar 40 mounted thereto. The handlebar 40 has right and left backwardly extending handles 43a, 43b attached to an upper end 40a thereof. The bracket 20 has a skid 45 mounted thereto in the manner as will be described later.

The skid 45 pierces soil to a depth at which the tines 17 are rotated to till the soil. During the tilling operation, the rotating tines 17 produce a force sufficient to overcome resistance provided by the skid 45 piercing the soil, such that the tiller 10 is moved or propelled.

Figure 2:
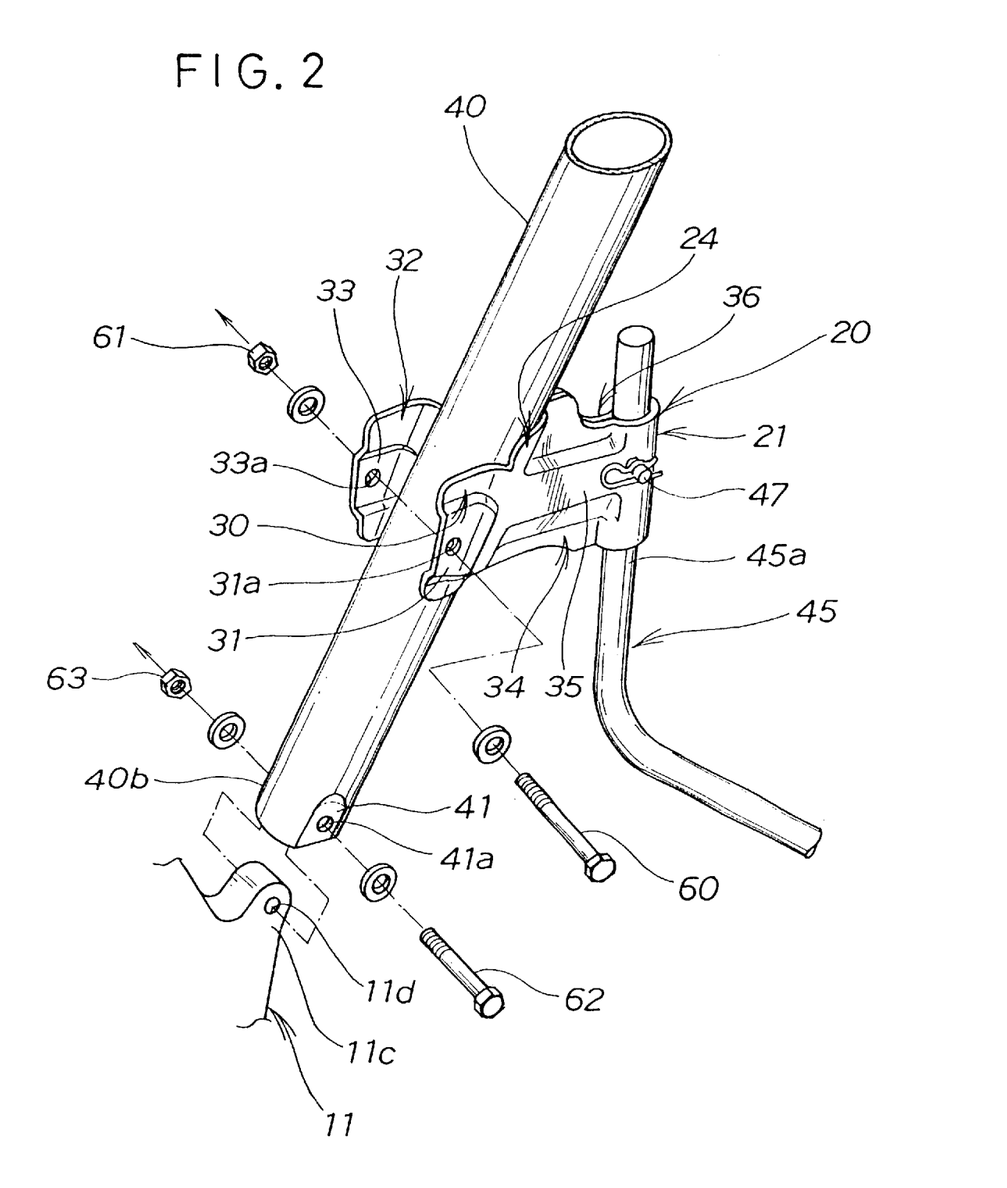
FIG. 2 is a perspective view of the support bracket of FIG. 1.

As shown in FIG. 2, the bracket 20 includes a cylindrical portion 21, a receiving portion 24, right and left connection portions 32, 30, and right and left flat plate portions 36, 34 both extending between the cylindrical portion 21 and the receiving portion 24. The cylindrical portion 21 has an insertion aperture 22 (see FIG. 4) formed therein. The skid 45 is inserted through the aperture 22. The receiving portion 24 is sized to receive the handlebar 40. The right and left connection portions 32, 30 are to be mounted to an upper part 11a (shown in FIG. 4) of the casing 11. The bracket 20 is made by bending a single plate in two in the manner as will be described later.

The connection portions 30, 32 have projection portions 31, 33, respectively, protruding outwardly. The projection portions 31, 33 have upper mounting apertures 31a, 33a formed therein, respectively. The upper part 11a (see FIG. 4) is fitted between the connection portions 30, 32 with the apertures 31a, 33a aligned with an upper mounting aperture 11b (see FIG. 5) of the casing 11. An upper mounting bolt 60 is then inserted through the aperture 11b, after which an upper nut 61 is tightened onto the bolt 60 to thereby fasten the bracket 20 to the upper part 11a of the casing 11.

The flat plate portions 34, 36 have right and left projecting portions 37, 35 (only one shown) extending between the cylindrical portion 21 and the receiving portion 24. The projecting portions 35, 37 reinforce the flat plate portions 34, 36 to thereby provide increased strengths to the flat plate portions 34, 36.

The skid 45 is a bar of circular cross-section. As shown in FIG. 1, the skid 45 has two bent parts. The skid 45 has a plurality of apertures 46 (only one shown) formed in an upper part 45a thereof. The apertures 46 are vertically aligned with each other. A lock pin 47 is inserted through selected one of the apertures 46, such that the skid 45 is held at an adjusted level.

The handlebar 40 has a lower end 40b compressed to provide flat portions 41, 42 (only one shown). The flat portions 41, 42 have lower mounting apertures 41a, 42a formed therein, respectively.

The casing 11 has a lower part 11c fitted into the lower end 40b of the handlebar 40 with the apertures 41a, 42a aligned with a lower mounting aperture 11d of the casing 11. A lower mounting bolt 62 is inserted through the aperture 11d. A lower nut 63 is tightened onto the bolt 62 to thereby fix the lower end 40b to the lower part 11c.

By thus compressing the lower end 40b, there can be formed the flat portions 41, 42. These flat portions 41, 42 have the apertures 41a, 42a formed therein. Using these apertures 41a, 42a allows the lower end 40b to be mounted to the lower part 11c.

This arrangement eliminates the need for an additional member for use in mounting the handlebar 40 to the casing 11.

For the prior art handlebar 102 shown in FIG. 10, there is a need to mount the lower mounting member 102a to the lower end of the handlebar 102 so as to attach the latter to the body 101.

Unlike the handlebar 102, the handlebar 40 of the invention can be attached to the casing 11 without requiring such a separate member as the member 102a. The handlebar 40 thus arranged is of simple construction and hence is less costly to produce.

Figure 3:
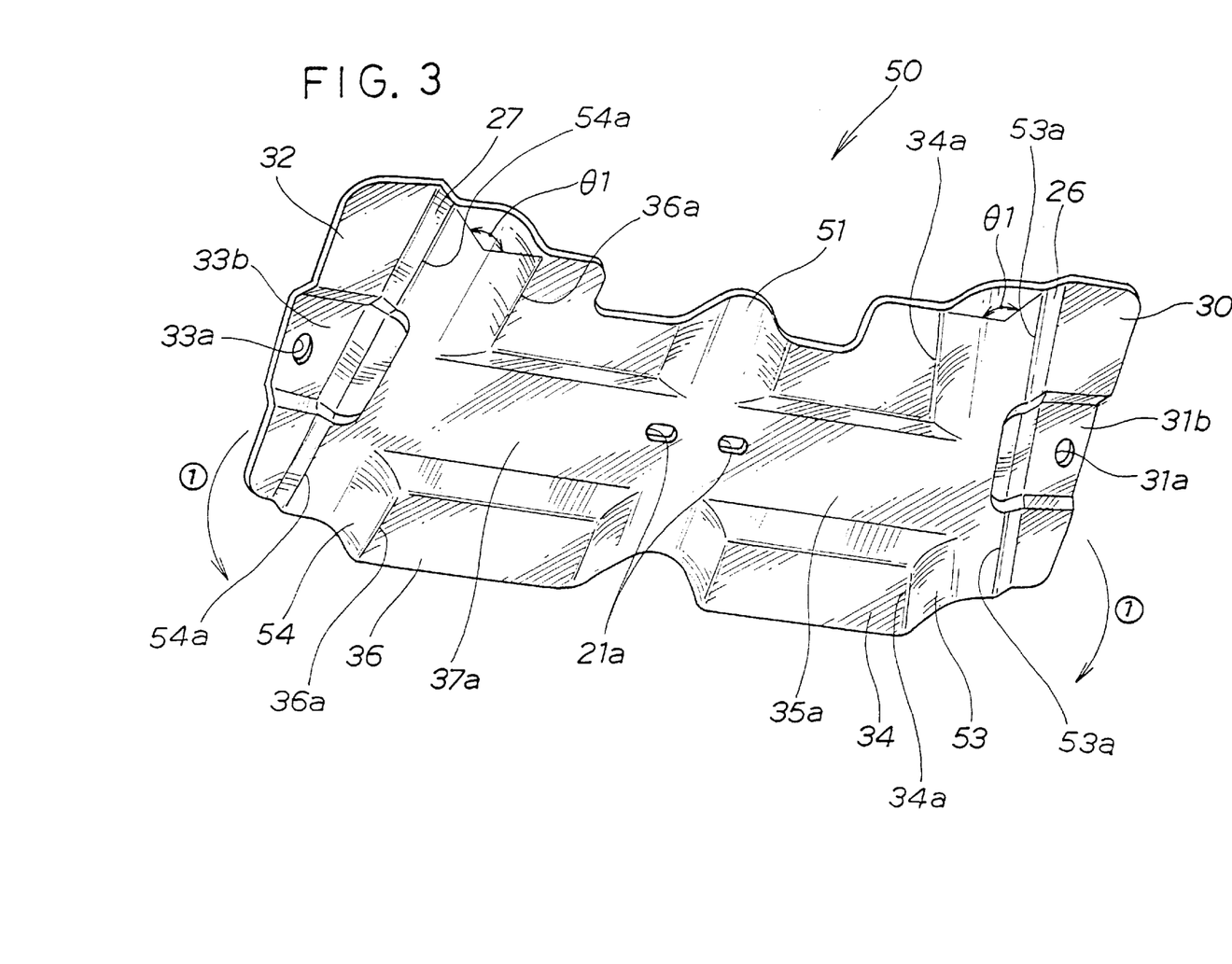
FIG. 3 is a view showing a plate which is not yet formed into the support bracket.

Referring to FIG. 3, there is shown the back side of a single plate 50 as previously formed using a press work machine. The plate 50 is of substantially rectangular configuration. The plate 50 includes a groove portion 51 formed centrally thereof, right and left flat plate portions 36, 34 positioned rightwardly and leftwardly of the groove portion 51, respectively, right and left curved portions 54, 53 continuous with the right and left flat plate portions 36, 34, respectively, and right and left connection portions 32, 30 having right and left taper portions 27, 26 continuous with the right and left curved portions 54, 53, respectively. The groove portion 51 extends in a direction substantially perpendicular to a longitudinal direction of the plate 50. The right curved portion 54 protrudes outwardly from a right edge 36a of the right flat plate portion 36 and extends in substantially parallel to the groove portion 51. The left curved portion 53 protrudes outwardly from a left edge 34a of the left flat plate portion 34 and extends in substantially parallel to the groove portion 51. The right and left flat plate portions 36, 34 have recessed portions 37a, 35a, respectively, formed therein. The recessed portion 37a extends between the groove portion 51 and the right curved portion 54 while the recessed portion 35a extends between the groove portion 51 and the left curved portion 53. The projecting portions 35, 37 extend longitudinally of the plate 50 and project in a direction in which the groove portion 51 is concaved. The right projecting portion 37 is positioned between the groove portion 51 and the right curved portion 54 while the left projecting portion 35 is positioned between the groove portion 51 and the left curved portion 53. Each of the curved portions 53, 54 is in the form of an arc, as viewed in plan. Such an arc is formed to provide a central angle 01 of about 90°. The right and left taper portions 27, 26 are disposed alongside the curved portion 54, 53, respectively. The right taper portion 27 protrudes outwardly from a right edge 54a of the right curved portion 54 whilst the left taper portion 26 protrudes outwardly from a left edge 53a of the left curved portion 53. All of the groove portion 51, the flat plate portions 34, 36, the curved portions 53, 54, the taper portions 26, 27, and the connection portions 30, 32 are formed simultaneously using the press work machine.

The recessed portions 35a, 37a are formed to thereby provide the right and left projecting portions 35, 37, respectively. The projecting portions 35, 37 protrude outwardly (in a direction which is directed down and out of the plane of this figure). The projecting portions 35, 37 reinforce the flat plate portions 34, 36, such that the flat plate portions 35, 37 increase in strength.

Recessed portions 31b, 33b are formed in the right and left connection portions 30, 32 to thereby provide the right and left projection portions 31, 33 (see FIG. 2). The right and left projection portions 31, 33 project outwardly from the right and left connection portions 30, 32.

The recessed portions 31b, 33b have the upper mounting apertures 31a, 33a formed therein. The groove portion 51 has long pin apertures 21a, 21a formed therein.

Figure 4:
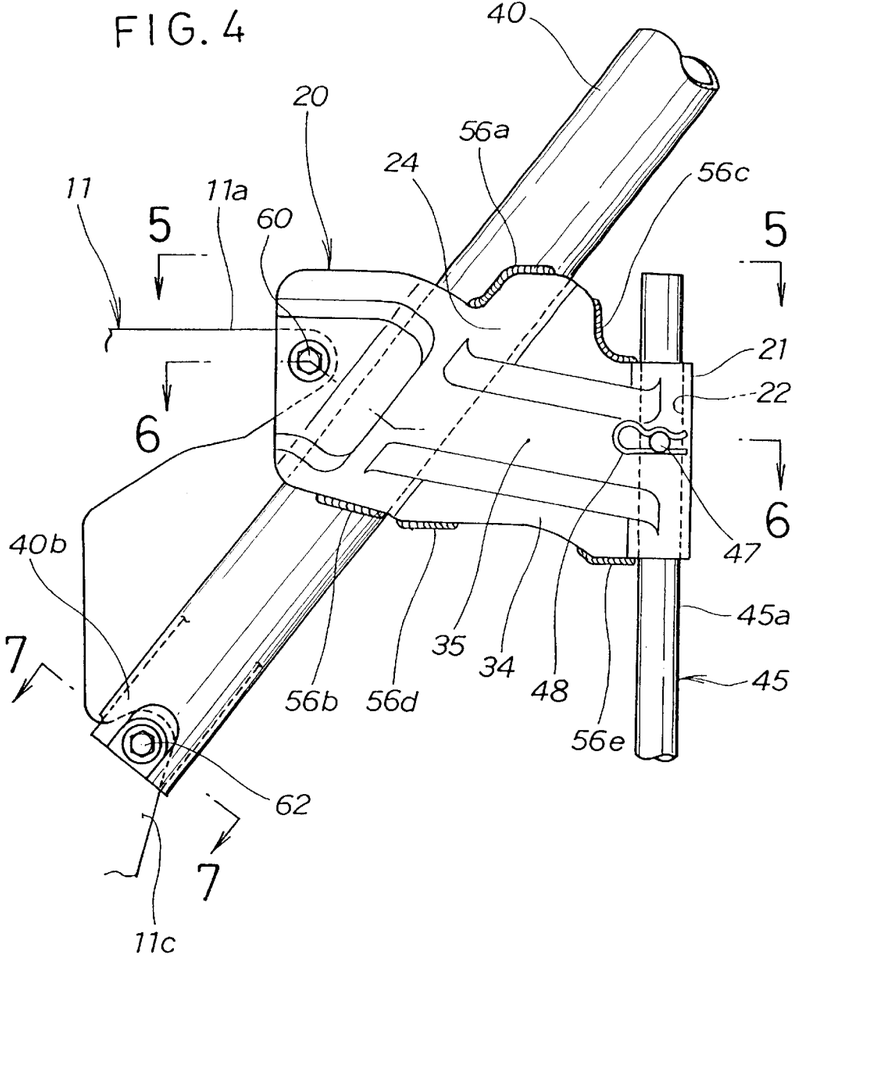
FIG. 4 is a side elevation view of the support bracket.
Figure 9A:
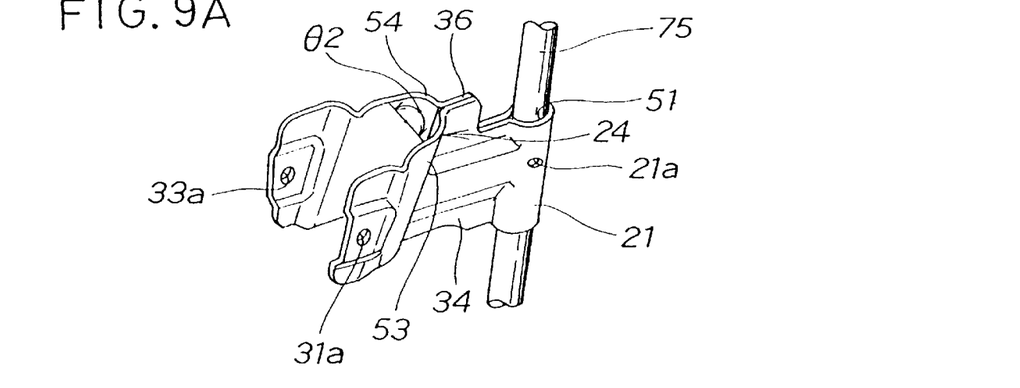
FIG. 9A to FIG. 9C show a manner in which the plate of FIG. 3 is formed into the support bracket.

When the plate 50 is bent in two, as shown by arrows 1, 1, the flat plate portions 34, 36 are moved together such that the groove portion 51 is formed into the cylindrical portion 21 (see FIG. 2). The cylindrical portion 21 is sized such that the skid 45 is inserted therethrough. At the same time, the curved portions 53, 54 are brought into opposed relation to each other to thereby provide the receiving portion 24. The curved portions 53, 54 cooperate to given an arc, as viewed in top plan. Such an arc provides a central angle θ2 of about 180°, as shown in FIG. 9A. The connection portions 30, 32 are disposed in opposed relation to each other. The connection portions 30, 32 are to be connected via the bolt 60 to the casing 11, as shown in FIG. 4. As will be described in detail, the bracket 20 can be formed from the plate 50.

As shown in FIG. 4, the handlebar 40 is welded to the receiving portion 24 to provide upper and lower welding portions 56a, 56b. The bracket 20 is mounted through the bolt 60 to the upper part 11a of the casing 11. The lower end 40b of the handlebar 40 is attached to the lower part 11c of the casing 11 by means of the bolt 62.

Further in FIG. 4, the skid 45 has the upper part 45a inserted through the aperture 22 of the cylindrical portion 21. The aperture 46 (see FIG. 6) is aligned with the apertures 21a, 21a, such that the lock pin 47 is inserted through the aperture 46. Therefore, the skid 45 remains inserted through the cylindrical portion 21. The lock pin 47 includes a cotter pin 48 mounted on an end portion thereof.

Figure 5:
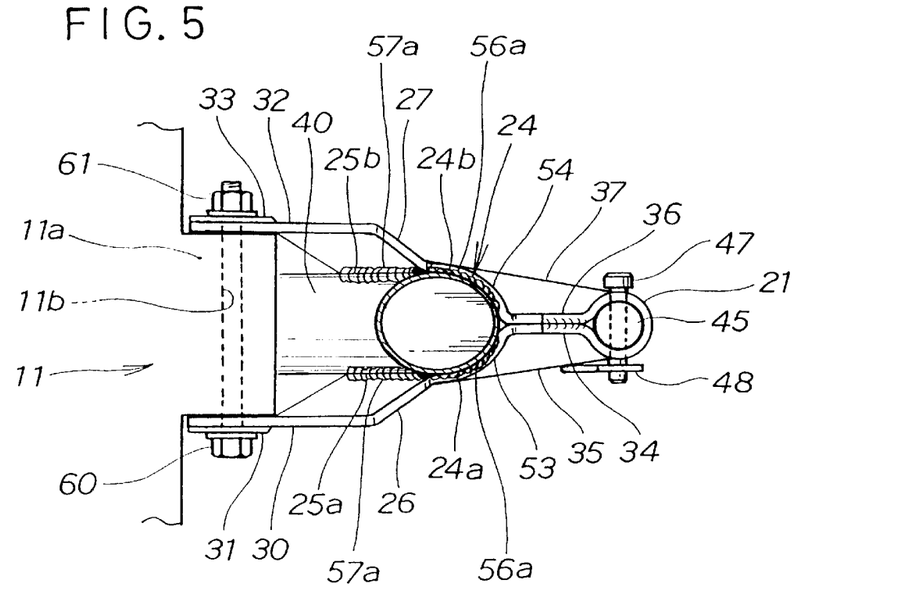
FIG. 5 is a cross-sectional view taken along line 5—5 of FIG. 4.

With respect to FIG. 5, the right and left curved portions 54, 53 extend from the right and left flat plate portions 36, 34, respectively, and open outwardly away from one another and cooperate to form the curved receiving portion 24 for receiving the handlebar 40. The handlebar 40 is welded to right and left upper ends 24b, 24a of the receiving portion 24 to thereby provide the welding portions 56a, 56a (see FIG. 4). The handlebar 40 is welded to end portions 25a, 25b of the receiving portion 24 to provide welding portions 57a, 57a. The connection portions 30, 32 are continuous with the taper portions 26, 27 extending from the receiving portion 24. The connection portions 30, 32 are attached to the upper part 11a of the casing 11 through the bolt 60. The projecting portions 35, 37 protrude outwardly from the flat plate portions 34, 36. The projecting portions 35, 37 are provided for reinforcing the flat plate portions 34, 36, respectively.

Figure 6:
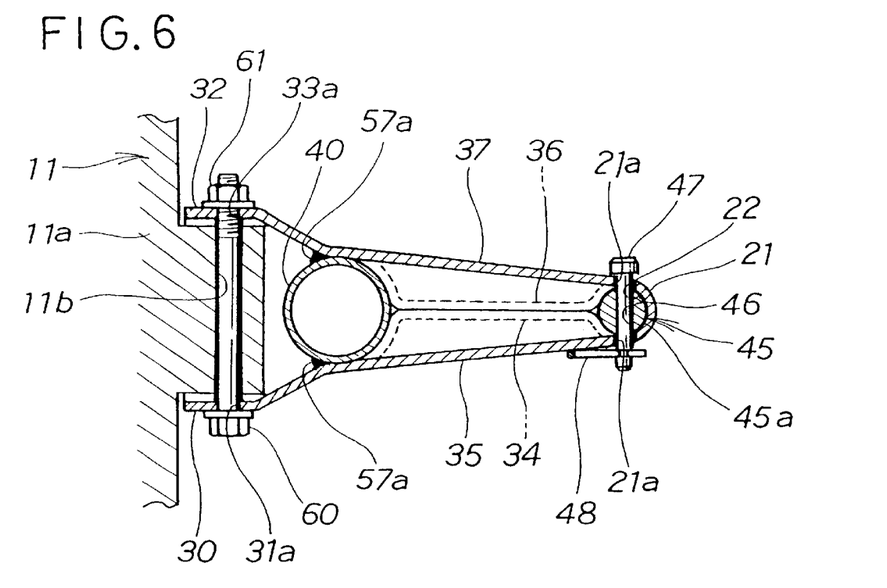
FIG. 6 is a cross-sectional view taken along line 6—6 of FIG. 4.

Referring to FIG. 6, the projecting portions 35, 37 of the flat plate portions 34, 36 extend from the cylindrical portion 21 to the handlebar 40. The nut 61 is tightened onto the bolt 60 inserted through the upper mounting aperture 11b, such that the connection portions 30, 32 are firmly attached to the casing 11.

Referring still to FIG. 6, the upper part 45a of the skid 45 is inserted through the insertion aperture 22 of the cylindrical portion 21. The lock pin 47 is inserted through the aperture 46 aligned with the apertures 21a, 21a to retain the upper part 45a of the skid 45 within the cylindrical portion 21. The cotter pin 48 mounted on the end portion of the lock pin 47 prevents the lock pin 47 from inadvertently moving out of the aperture 46.

Figure 7:
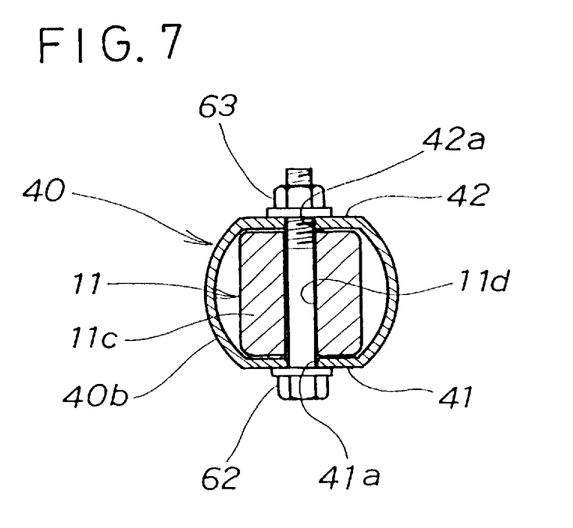
FIG. 7 is a cross-sectional view taken along line 7—7 of FIG. 4.

Reference is made to FIG. 7. The flat portions 41, 42 of the lower end 40b of the handlebar 40 are shown having the lower mounting apertures 41a, 42a formed therein, respectively.

The lower part 11c of the casing 11 is fitted within the lower end 40b of the handlebar 40 to bring the lower mounting aperture 11d of the casing 11 into alignment with the apertures 41a, 42a. The lower mounting bolt 62 is inserted through the aperture 11d. The nut 63 is secured onto the bolt 62 to thereby attach the lower end 40b to the lower part 11c of the casing 11.

Description will be made as to how the bracket 20 is formed in accordance with the present invention.

Figure 8A:
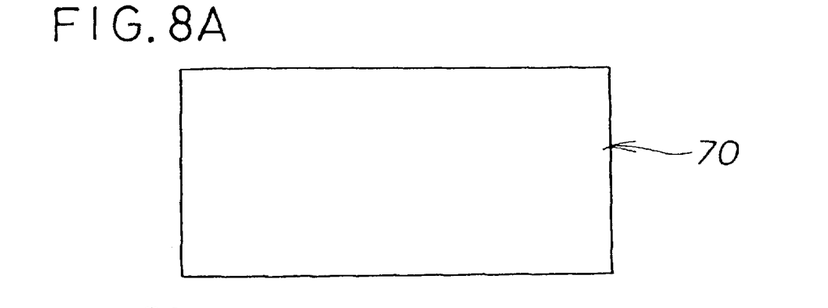
FIG. 8A to FIG. 8C show a manner of subjecting a single plate to press working to provide the plate of FIG. 3.

FIG. 8A shows the back side of a substantially rectangular plate 70 to be formed into the bracket 20.

Figure 8B:
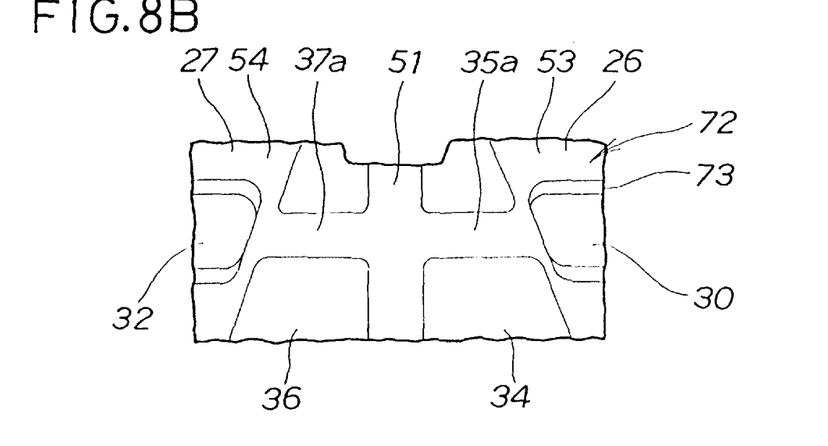

As shown in FIG. 8B, the plate 70 is formed into a pressed plate 72 by undergoing a press working. The pressed plate 72 includes the groove portion 51 formed centrally thereof, the flat plate portions 34, 36, the curved portions 53, 54, the taper portions 26, 27, and the connection portions 30, 32 as thus far explained with reference to FIG. 3.

As can be seen from this figure, there are formed the recessed portions 35a, 37a to thereby provide the aforementioned projecting portions 35, 37 protruding in a direction which is directed down and out of the plane of this sheet.

Figure 8C:
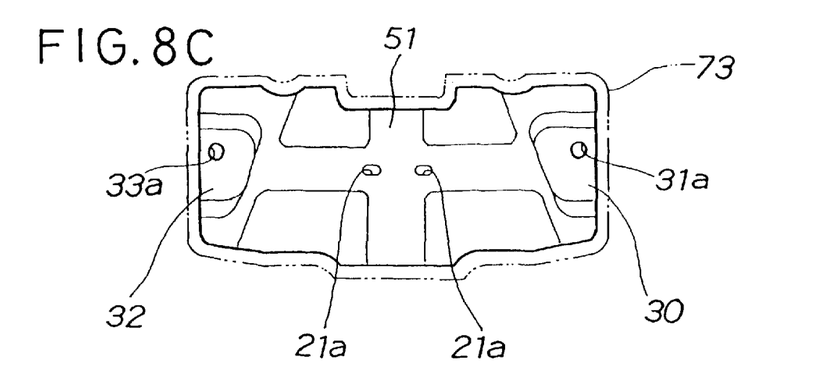

As shown in FIG. 8C, the pressed plate 72 is then subjected to piercing or perforating operation such that the former has formed therein the pin apertures 21a, 21a and the upper mounting apertures 31a, 33a.

The pressed plate 72 subsequently undergoes trimming operation whereby a peripheral edge 73 of the pressed plate 72 is trimmed off. There can thus be obtained the plate 50 as shown in FIG. 3.

Referring to FIG. 9A, a rod-shaped jig 75 is snugly received in the groove portion 51 formed at the mid-portion of the plate 50. The plate 50 is then bent in two at the mid-portion around the jig 75 to thereby form the groove portion 51 into the cylindrical portion 51 sized such that the skid 45 can be inserted therethrough.

At the same time, the flat plate portions 34, 36 are mated or joined together to thereby bring the curved portions 53, 54 into opposed relation to each other. The curved portions 53, 54 thus arranged cooperate to provide the receiving portion 24.

The pin apertures 21a, 21a (only one shown) are aligned with each other. Similarly, the upper mounting apertures 31a, 33a are aligned with each other.

Figure 9B:
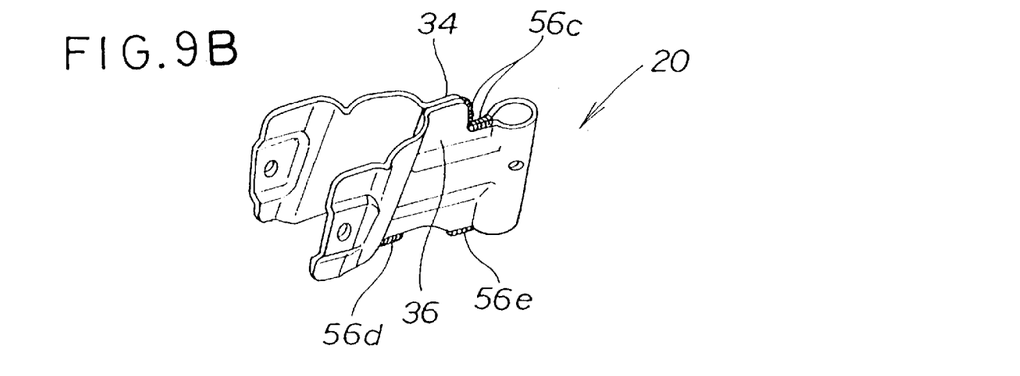

As shown in FIG. 9B, the flat plate portions 34, 36 are welded together along edges thereof at portions 56c, 56d, 56e where the flat plate portions are in contact with one another. Accordingly, there can be obtained the bracket 20.

Figure 9C:
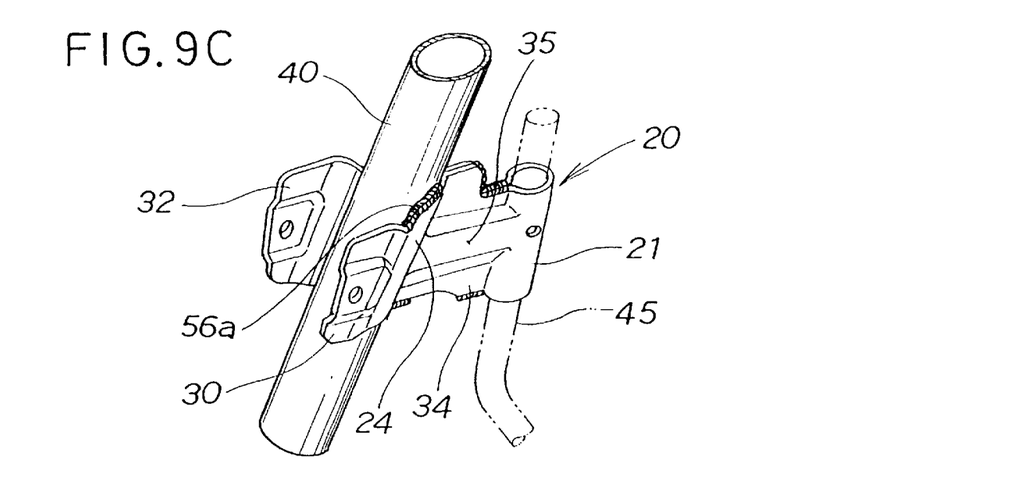

Referring to FIG. 9C, the handlebar 40 is received in the receiving portion 24. The handlebar 40 is welded to the receiving portion 24 at the welding portions 56a, 56b, 57a (only one shown).

As discussed above, the bracket 20 includes the cylindrical portion 21 sized such that the skid 45 is inserted therethrough, the receiving portion 24 sized to receive the handlebar 40, and the connection portions 30, 32 to be attached to the casing 11. The cylindrical portion 21 and the receiving portion 24 can be formed by bending a single plate in two and joining the flat plate portions 34, 36 together. Thus the bracket 20 is formed from a single plate bent at its mid-portion to form the cylindrical portion 21 and having two opposed plate portions that extend outwardly in the same direction from the cylindrical portion 21 to form the flat plate portions 34, 36, the curved portions 53, 54 and the connection portions 30, 32.

The bracket 20 can thus be formed without using additional parts. The bracket 20 is simple in construction.

Since the flat plate portions 34, 36 include the projecting portions 35, 37 each extending between the receiving portion 24 and the cylindrical portion 21, they increase the strength of the bracket 20. Namely, the flat plate portions 34, 36 are reinforced by the projecting portions 35, 37 resulting in an increase in strength. It is therefore ensured that the skid 45 remains inserted through the cylindrical portion of the bracket 20.

The bracket 20 may be varied in configuration in correspondence to the configuration of the casing 11.

Although the angles 01, 02 are set to be 90, 180 degrees, respectively, in the illustrated embodiment as described above, they may be optionally selected.

Obviously, various minor changes and modifications of the present invention are possible in the light of the above teaching. It is therefore to be understood that within the scope of the appended claims, the invention may be practiced otherwise than as specifically described.

What is claimed is:

1. A support bracket for use in attaching a handlebar and a skid to a body of a tiller, said support bracket comprising:

a cylindrical portion sized to permit the skid to be inserted therethrough; and a receiving portion sized to receive the handlebar; said cylindrical portion and said receiving portion being formed by bending a generally rectangular single plate in two;

wherein said plate includes a groove portion formed centrally of said plate, said groove portion extending in a direction substantially perpendicular to a longitudinal direction of said plate;

right and left flat plate portions positioned rightwardly and leftwardly of said groove portion, respectively;

right and left curved portions extending substantially parallel to said groove portion, said right curved portion extending outwardly from a right edge of said right flat plate portion, said left curved portion extending outwardly from a left edge of said left flat plate portion; and right and left connection portions extending substantially parallel to said groove portion, said right connection portion extending outwardly from a right edge of said right curved portion, said left connection portion extending outwardly from a left edge of said left curved portion, so that when said plate is bent in two, said groove portion is formed into said cylindrical portion, said right and left curved portions are opposed to each other to provide said receiving portion, and said right and left connection portions are opposed to each other in such a manner as to be connected to said body of said tiller;

said right and left flat plate portions including right and left projecting portions, respectively, extending longitudinally of said plate, said right projecting portion being positioned between said groove portion and said right curved portion, said left projecting portion being positioned between said groove portion and said left curved portion, and said right and left projecting portions projecting in a direction in which said groove portion is concaved, said right and left projecting portions reinforcing said right and left flat plate portions, respectively.

2. A support bracket according claim 1 wherein the single plate comprises a pressed plate.

3. A support bracket according to claim 1 wherein the right and left flat plate portions are connected together along edges where the right and left flat plate portions are in contact with one another.

4. A support bracket according to claim 1 wherein the right and left flat plate portions are welded together along edges where the right and left flat plate portions are in contact with one another.

* * * * *